March 8, 1927.  1,620,435
R. S. BURDETTE
AIR BAG
Filed May 23, 1925  3 Sheets-Sheet 1
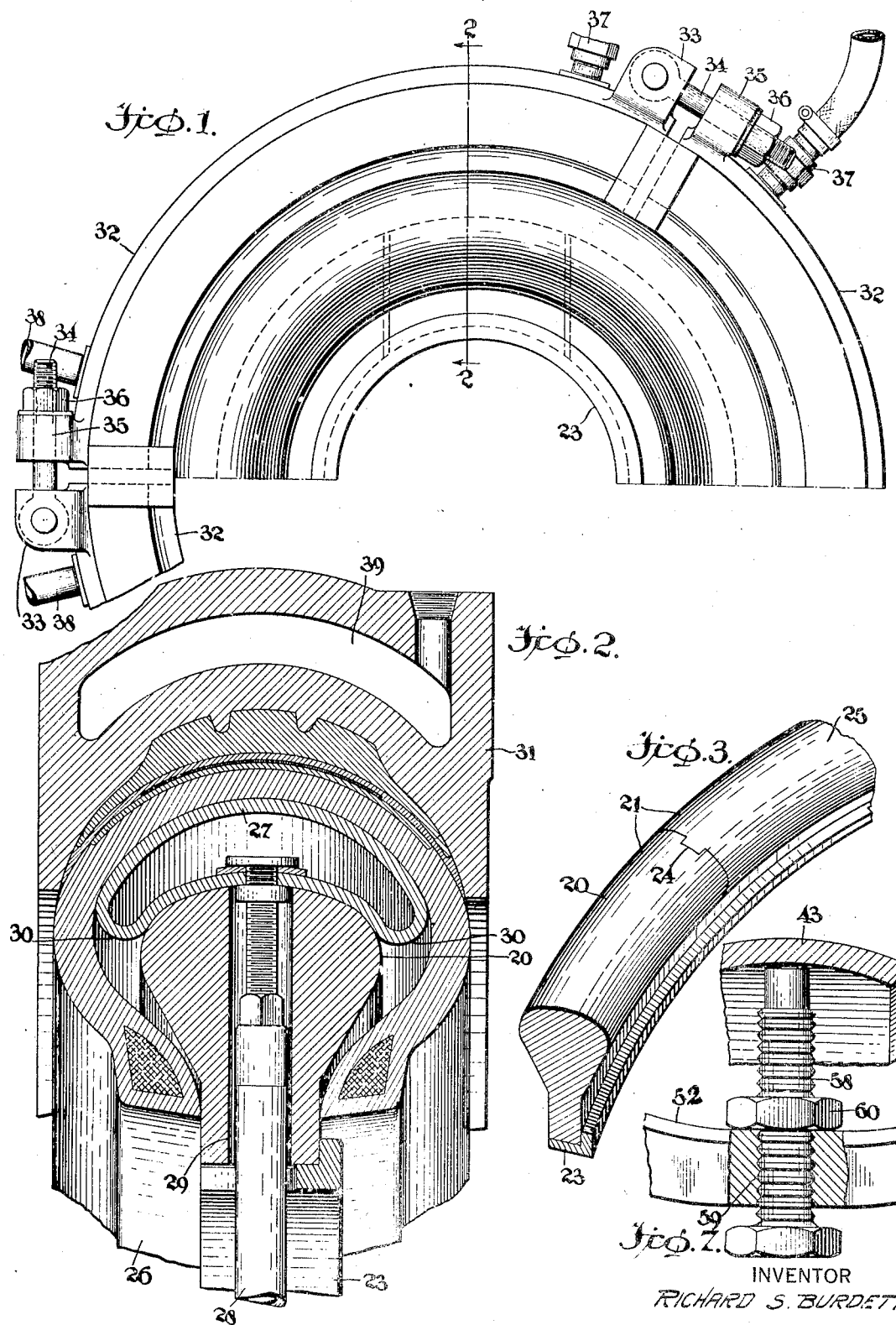
INVENTOR
RICHARD S. BURDETTE
BY
ATTORNEY March 8, 1927. 1,620,435
R. S. BURDETTE
AIR BAG
Filed May 23, 1925 3 Sheets-Sheet 2
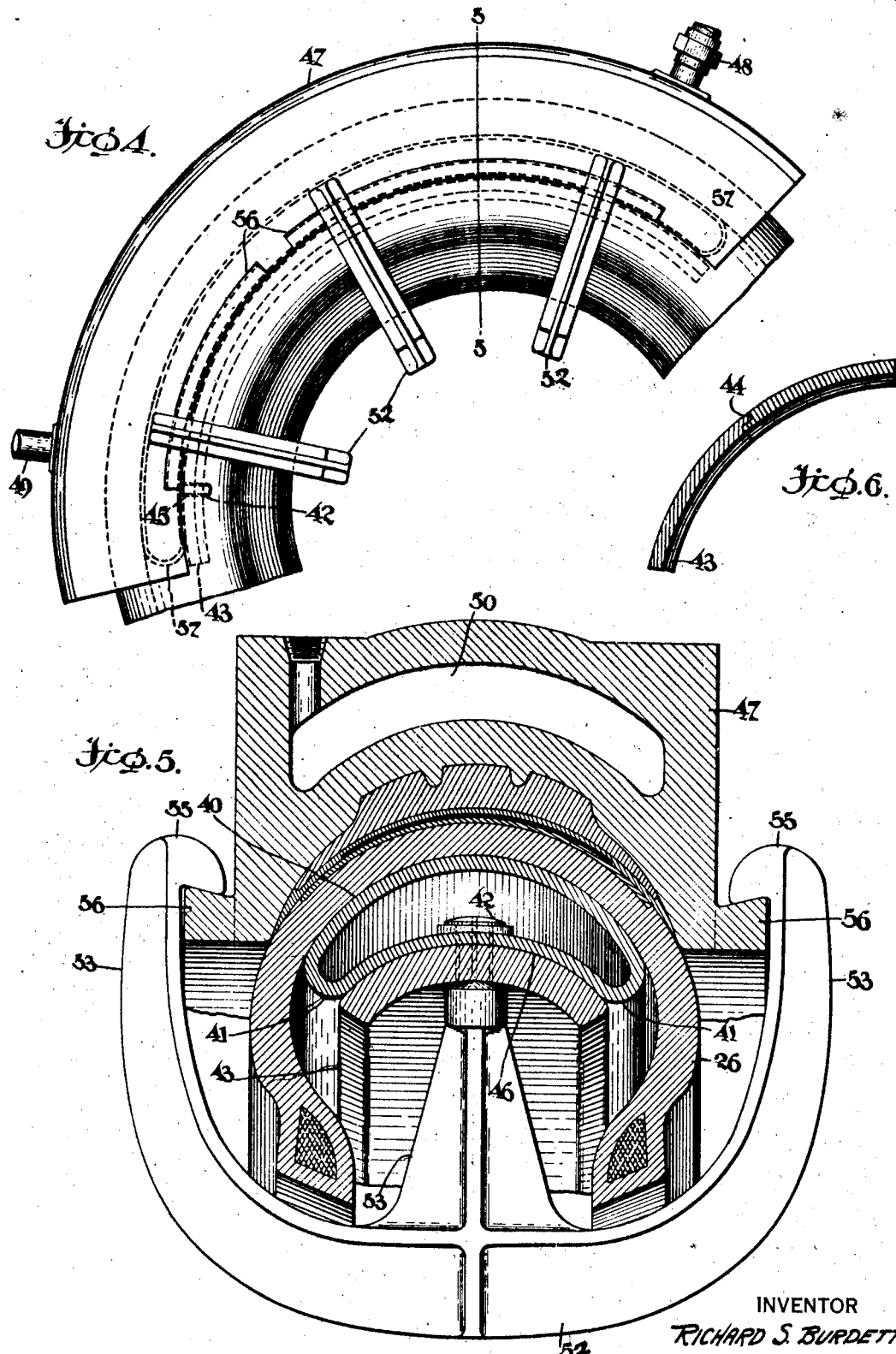
INVENTOR
RICHARD S. BURDETTE
BY
ATTORNEY March 8, 1927.   R. S. BURDETTE   1,620,435
AIR BAG
Filed May 23, 1925   3 Sheets-Sheet 3
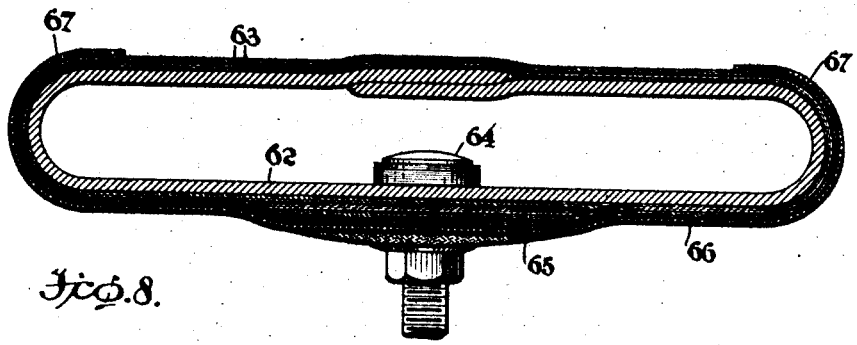
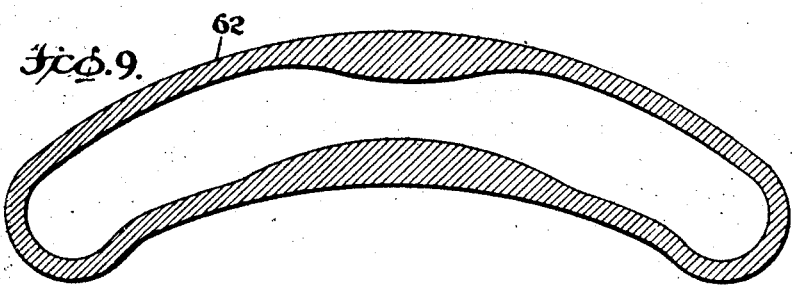
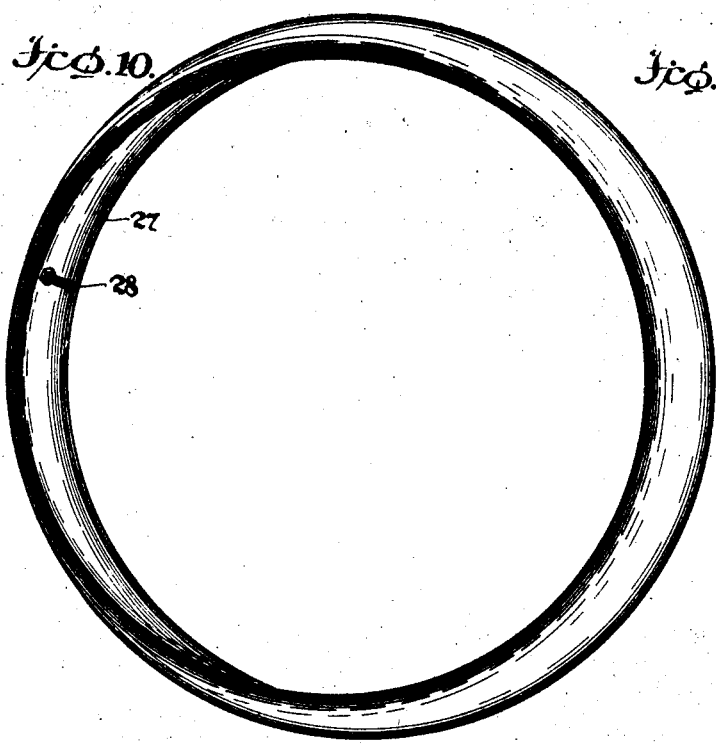
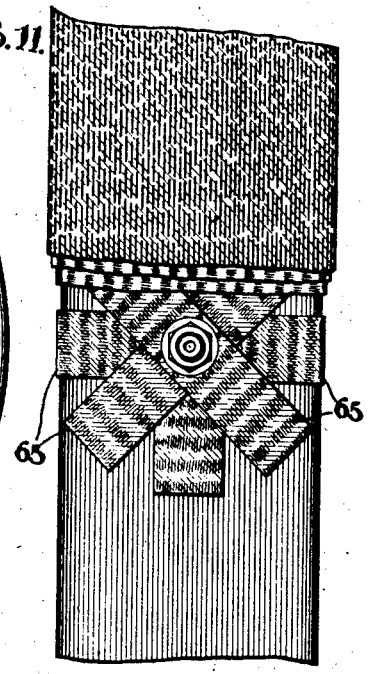
INVENTOR
RICHARD S. BURDETTE
BY
ATTORNEY Patented Mar. 8, 1927.

1,620,435

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

AIR BAG.

Application filed May 23, 1925. Serial No. 32,389.

My invention relates to cores employed in vulcanization of pneumatic tire casings and it has particular relation to cores of the inflatable type suitable for use in repairing such casings.

One object of my invention consists in providing a novel type of vulcanizing core which is constructed of a relatively small amount of flexible material which depends upon its flexing qualities rather than its resilient qualities to conform to the shape of a tire casing being repaired.

Another object of my invention is to provide a flexible fluid container which is so arranged upon a supporting member that it is equally well adapted for use as a vulcanizing core in various sizes and types of tire casings.

Another object of my invention is to provide a vulcanizing core which reduces to a minimum the deteriorating stresses caused by fluid pressure exerted upon the internal walls of a flexible bag forming a part of the core.

Another object of my invention consists in providing a vulcanizing core in which fluid pressure is employed and which is so constructed that a relatively small volume of fluid suffices to produce a maximum amount of pressure against a tire casing.

A further object of my invention consists in providing a vulcanizing core composed of replaceable rigid members and a replaceable inflatable flexible portion, which members and portion are adapted to be quickly assembled or dismantled.

My invention was developed particularly with a view to improving vulcanizing cores in which so-called airbags are employed. In the repair of pneumatic casings it is necessary to vulcanize the uncured rubber used in the repair in order to give to the repaired portion a toughness and strength comparable with the other portions of the casing. In vulcanizing a tire casing, the defective portions are removed, raw rubber or rubber and fabric is inserted in place thereof, and the repaired casing is placed within a heated metallic mold having a recess which conforms to the contour of the outer surface of the casing. Within the casing is inserted an inflatable pneumatic core or airbag which is of substantially the same diameter as the inner periphery of the casing and is of slightly greater length than the repaired portion of the casing. As the airbag is inserted within the casing and the casing placed in a mold, the airbag is so inflated as to hold the repaired portion of the casing in close contact with the mold while desired pressure and heat are applied to the casing and mold, respectively. If desired, the airbag may be heated by inflating it with either steam or hot water.

Airbags of this character have heretofore been commonly made solely of rubberized fabric which is adapted to stretch in all directions when subjected to inflation under high pressure. One objection to this type of airbag has been that, although the walls of the bag are reinforced by contact with the inner surface of the tire casing and are not subjected to any injurious stresses upon this surface, nevertheless the end portions thereof are totally unsupported and are subjected to the same pressure as the contacting walls of the airbag. As the pressure necessary to properly cure and repair the casing is reasonably high, the total force developed in an airbag of large diameter, such as a truck tire or balloon tire bag, is very great. This being true, it is necessary to reinforce the ends of the airbags by the addition of layers of reinforcing material in order to prevent injury to the bags. Also, in order to provide proper anchorage for these reinforcing ends, it is necessary to construct the side walls of heavier material than would otherwise be required.

Another objection of this type of bag is that, owing to the difference in length of the outer periphery and the inner periphery of the bag and the fact that the ends thereof are disposed at a considerable angle to each other, certain unbalanced stresses are produced therein which tend to deform the bag excessively adjacent the bead portions of the tire casing. A still further objection to this type of bag is that, as the bag is unitary, when one portion thereof fails, the entire bag is rendered useless.

By my invention I have obviated these objections by providing a relatively large supporting member for supporting an airbag against a tire which substantially eliminates the undesirable effects of unbalanced forces developed in the bag, thereby reducing the strain imposed upon the end of the bag when a sectional bag is employed and necessitating only a small volume of fluid to obtain relatively high pressure.

For a more thorough description of my invention, reference may now be had to the accompanying drawings forming a part of this specification, and in which:

Fig. 1 is a fragmentary view of a tire mold and a tire casing used in conjunction with one application of my invention;

Fig. 2 is a cross-sectional view taken along the line II—II of Fig. 1 showing an airbag and a supporting member therefor within a tire mold constructed in accordance with my invention;

Fig. 3 is a perspective view of a rigid core upon which an airbag is adapted to be mounted;

Fig. 4 is a fragmentary view of a tire mold similar to that illustrated in Fig. 1, showing an application of my invention in modified form;

Fig. 5 is a cross-sectional view showing a securing bracket supporting a tire in a mold, the view being taken along the line V—V of Fig. 4;

Fig. 6 is a view in detail of a core used in the embodiment of my invention as shown in Figs. 4 and 5;

Fig. 7 is a view in detail of a modified form of construction of the bracket member shown in Fig. 5;

Fig. 8 is a cross-sectional view of an airbag constructed in accordance with my invention;

Fig. 9 is a cross-sectional view of an airbag in the first stages of manufacturing before fabric is applied thereto;

Fig. 10 is a perspective view of a full circle airbag constructed in accordance with my invention; and Fig. 11 is a view on an enlarged scale of a portion of an airbag illustrating the manner in which the airbag is reinforced about the valve connection thereof.

In practicing my invention, and referring to the embodiment thereof illustrated in Figs. 1, 2, and 3, I have provided a core 20 consisting of arcuate sections 21 preferably composed of rigid material, such as wood, the sections thereof being adapted to be constructed in the form of an annulus or ⅓ or ¼ circles. Sections of the core are retained upon a ring 23 and are provided with fittings, as indicated at 24, which prevent relative lateral displacement and insure a snug fit between the ends of the respective sections. It will be observed that the core is substantially pear-shaped in cross-section and is provided with an outer peripheral surface 25 which substantially conforms to the shape of the inner surface of a tire casing 26.

On the outer peripheral surface of the core, I have provided a flexible sleeve or envelope 27, which, according to the embodiment of my invention, as illustrated in Figs. 1 to 3 and 10, is preferably in the form of an endless flexible tube of substantially crescent-shape in cross-section and so constructed that it is adapted to expand slightly in a circumferential direction but is non-resilient transversely. The envelope 27 is provided with a conventional valve connection 28, which extends through an opening 29 formed radially of the core 20 to permit introduction or removal of suitable inflating fluid. If desired, other similar valve connections may be provided in order to maintain a circulation of heated fluid through the envelope.

As best illustrated in Fig. 2, the envelope 27 mounted upon the core is disposed within the tire casing 26 and engages a portion of the casing, adjacent the tread, which is to be repaired. The space occupied by the envelope between the core and the surface of the casing is very narrow and approximately of crescent-shape in cross-section. Oppositely disposed folds 30 of the envelope are adapted to flex against the surface of the core and the adjacent surface of the casing when fluid is admitted into the envelope under pressure. As shown in the drawings the distance between the surface of the core and the adjacent surface of the tire casing appears to be considerable, but this is an exaggerated view and is illustrated in this manner for the sake of clearness. In actual practice, the distance between these surfaces is very slight.

A small amount of fluid is introduced within the envelope 27 in order that it may engage the casing with enough force to maintain it in operative position and it is placed within a mold 31 of conventional type formed of several sections 32 as best shown in Fig. 1. Adjacent the opposed ends of the respective sections of the mold, I have provided lugs 33 adapted to receive bolts 34 pivoted thereto, the latter being adapted to swing into engagement with slotted lugs 35 and to be held in place by nuts 36. By utilizing this structure, it will be observed that the mold may be adjusted to receive various sizes of tire casings. Each section of the mold is provided with an inlet valve connection 37 and an outlet valve connection 38, which permit of circulation of a heating fluid within a heating chamber in the form of a hollow portion of the mold, as indicated at 39, which is disposed adjacent the tread portion of the casing while it is being repaired.

After the casing is placed in the mold, the latter is adjusted to conform to the size of the tire casing and fluid under pressure is admitted through the valve 28 until the desired pressure is attained against the inner surface of the casing. Upon the introduction of fluid through the valve 28, the folds 30 occupying the narrow space between the core and the casing, are subjected to relatively little stress because the force is primarily imposed upon the surface 25 of the core and the oppositely disposed portion of the casing. In fact the reduction of intensity of the stresses caused by this arrangement is so marked that utilization of envelopes composed of relative small amounts of material is made possible without reducing the amount of pressure against the repaired portion of the casing. Also, it will be observed that the beads of the casing are free from engagement with any part of the pressure area and cannot be damaged by deformation of the envelope or airbag against them.

Referring now to Figs. 4, 5, and 6, it will be observed that an envelope 40, substantially of crescent-shape in cross-section, is provided with folds 41 similar to the structure shown in Fig. 2. The envelope is also provided with a valve connection 42, but the envelope or bag in this case is in the form of a sector of an annulus and it is disposed on an arcuate metal support 43. The metal supporting member is composed of sections which are held in abutting relationship, as indicated at the joint 44. In order to accommodate the valve 42, an opening 45 is provided through the support 43 and is adapted to receive the valve therethrough. A convex surface 46 is also formed on the support 43 similar to the surface 25, above described, and is adapted to support the envelope in exactly the same manner as the core 20 supports the envelope 27.

In this embodiment of my invention, I have employed a mold 47 in one section provided with an inlet valve connection 48 and an outlet valve connection 49, each of which communicates with a heating chamber 50. When the metal support 43 with the envelope mounted thereon is disposed within the casing, U-shaped brackets 52, having arms 53 and projecting members 54, are arranged to engage the metal support. The arms of the bracket which are provided with lugs 55 are hooked over flanges 56 upon the mold, thereby retaining the core, tire and mold in assembled relationship.

When fluid under pressure is admitted to the envelope 42, each of the folds 41 thereof flex between the surface of the metal support and the surface of the casing 26, while the end portions, indicated at 57, flex in substantially the same manner longitudinally of the metal support.

As a modification of the projecting member 53, I have shown in Fig. 7 a screw threaded bolt 58 adapted to be adjusted within the screw threaded opening 59 provided in the U-shape member 52, the upper end of the bolt being adapted to engage the inner periphery of the metal support 43. A lock nut 60 is provided for the purpose of securing the bolt in adjusted position. By this construction the peripheral surface of the supporting member 43 may be brought as closely as desired to the inner periphery of the tire casing before the fluid under pressure is admitted to the envelope.

In order to have a thorough understanding of the preferred method of constructing an envelope or airbag suitable for use in connection with the practice of my invention, reference may now be had to Figs. 8 to 11. In these figures, I have shown a bag or impervious container 62 composed of vulcanizable material, such as rubber, which is provided with one or more layers of cord fabric 63 wound transversely about the container in such manner that the cords will resist any tendency toward crosswise expansion of the container. A suitable valve connection 64 is inserted through the wall of the container and is reinforced by means of a plurality of fabric strips 65, as clearly shown in Fig. 11. After the cords are wound transversely about the container, one or more layers of cross-woven fabric 66 are applied, which extend about the portion of the envelope that is adapted to rest upon a supporting core.

Each edge of the cross-woven fabric, as indicated at 67, extends over the sides of the envelope a sufficient distance to include the folded portions, which are clearly indicated at 30 and 41 in Figs. 2 and 5, respectively.

In the form shown in Fig. 8, the rubber container, the cords and fabric are vulcanized together, thus providing an envelope or airbag which will expand longitudinally when such expansion is necessary, but which is prevented from transverse expansion by reason of the transversely arranged inextensible cords incorporated therein. Airbags constructed as above described may be made in full circle formation, as shown in Fig. 10, or in segment formation, as shown in Fig. 4.

From the foregoing description, it will be apparent that I have provided a novel type of vulcanizing core in which stresses are so reduced and distributed that relatively high pressure may be employed without detriment to a bag composed of a relatively small quantity of light weight fabric or cords.

The narrower the space between the core and the opposing surface of the tire casing, the less will be the stress imposed upon the airbag. It will also be apparent that by obviating unbalanced forces and by reducing the stretching properties of the bag to a minimum, the life of the bag will be materially prolonged. Moreover, the possibility of injury to the casing being cured by the airbag will be obviated. It will be further apparent that the life of the bag of the character described will be greater than that of the old type of bag because the thinner walls may be subjected to flexing with less injury thereto than is incident to the flexing of a bag having thicker walls. Furthermore, when the flexible envelope has become impaired, it is replaced, the life of the rigid portions of the core being indefinite and materially greater than that of the rubberized fabric portion.

Although I have illustrated the preferred forms which my invention may assume and have described in detail but a single application thereof, it will be apparent to those skilled in the art that the invention is not so limited, but that various minor modifications and changes may be made therein without departing from the spirit of my invention or from the scope of the appended claims.

What I claim is:

1. A vulcanizing apparatus for tire casings comprising a mold member adapted to be disposed about the outer periphery of the casing, a rigid annular member pear-shaped in cross section adapted to be disposed within the tire casing, and a flexible inflatable fluid container substantially crescent shaped in cross section adapted to be interposed between the casing and the outer periphery of the annular member, the parts being so constructed and arranged that the cusps of the flexible container are unsupported and are confined movably between the side walls of the casing and the annular member.

2. A vulcanizing apparatus for tire casings comprising a mold member adapted to be disposed about the outer periphery of the casing, a rigid annular member pear-shaped in cross section adapted to be disposed within the tire casing, and a flexible inflatable fluid container substantially crescent shaped in cross section adapted to be interposed between the casing and the outer periphery of the annular member, the parts being so constructed and arranged that the bead portions of the tire casings are unconfined, and the cusps of the flexible container are unsupported and confined between the side walls of the casing and the annular member; whereby the stresses within the air bag are distributed and a maximum force is imposed against the inner surface of the casing.

3. A flexible core for use in vulcanizing tire casings comprising an arcuate rubber envelope having a plurality of cords disposed transversely thereof, a layer of square woven fabric disposed on the inner periphery thereof, and strips of diagonally disposed fabric positioned over a valve stem secured to the core.

4. A flexible core for use in vulcanizing tire casings comprising an annular member of crescent shaped cross section having cord fabric reinforcements disposed transversely of a rubber envelope, cross woven fabric disposed on the inner circumference and enclosing the cusps of the envelope, a valve secured to the envelope and fabric reinforcements for the valve disposed diagonally of the annular member, the entire assembly being vulcanized to form a unitary structure expansible in a circumferential direction.

In witness whereof, I have hereunto signed my name.

RICHARD S. BURDETTE